United States Patent [19]

Kawanishi et al.

[11] 4,415,903

[45] Nov. 15, 1983

[54] ELECTRIC INK TRANSFER RECORDING METHOD

[75] Inventors: Toshiyuki Kawanishi; Yukio Tabata, both of Numazu, Japan

[73] Assignee: Ricoh Co., Ltd., Tokyo, Japan

[21] Appl. No.: 366,812

[22] Filed: Apr. 8, 1982

[30] Foreign Application Priority Data

Apr. 16, 1981 [JP] Japan ................................ 56-57514

[51] Int. Cl.³ ........................ G01D 9/00; G01D 15/10

[52] U.S. Cl. ................................ 346/1.1; 346/76 PH

[58] Field of Search .................................. 346/76, 1.1

[56] References Cited

U.S. PATENT DOCUMENTS

| | | | |
|---|---|---|---|
| 2,683,111 | 7/1954 | Greig | 346/76 R X |
| 3,090,663 | 5/1963 | Schaeder et al. | 346/75 X |
| 3,369,933 | 2/1968 | Shulman et al. | 346/1.1 X |
| 4,359,748 | 11/1982 | Pasini et al. | 346/76 PH |

*Primary Examiner*—Donald A. Griffin

*Attorney, Agent, or Firm*—Flynn, Thiel, Boutell & Tanis

[57] ABSTRACT

An electric ink transfer recording method for obtaining a recorded matter which comprises putting a sheet to be recorded and an ink sheet generating Joule's heat when electrified and having a thermo-melting ink layer together; applying electricity to said ink sheet by contacting a return circuit electrode with the ink sheet and a recording electrode needle (stylus) with the surface of the ink sheet and impressing pulse voltage thereupon; and transferring the ink from the ink sheet to the sheet to be recorded, characterized in that an insulating liquid is interposed between the ink sheet and the recording electrode needle when obtaining the recorded matter.

6 Claims, 3 Drawing Figures

ELECTRIC INK TRANSFER RECORDING METHOD

BACKGROUND OF THE INVENTION

1. Field of the Invention

The present invention relates to an electric ink transfer recording method and more particularly to an electric ink transfer recording method for use in a noiseless typewriter, printing the record that a desk-model electronic calculator provides, output of an electronic calculator, video recording of a facsimile telegraph and the like.

2. Description of the Prior Art

As the efficiency of electronic calculator, facsimile or the like is highly enhanced, its terminal means, namely a printer, has also come to hold an important position. This terminal means is classified roughly into an impact printer (mechanical printer) and a non impact printer. As the non impact recording system, further, there are known (1) electrophotography, (2) thermosensitive recording, (3) electrosensitive recording, (4) thermosensitive transfer, (5) electric ink transfer and the like. However, the former impact printer is defective in that it is unable to avoid the noise generated structurally therefrom.

On the other hand, the latter (non impact printer) recording system is surely profitable in that it does not generate noise, but includes various problems to be solved. For instance, the electrophotographic system is defective not only in that it requires five steps such as electrification-exposure-development-transfer-cleaning and consequently the process is complicated but also in that it is inferior in reliability as to whether it always produces high quality transfer images and it is difficult to be small-sized. The thermosensitive recording system is defective in that it is observed to have a hard point to settle in respect of the preservability of thermosensitive recording paper used therein and that the thermosensitive recording paper per se must be a processed paper having a thermosensitive recording layer and therefore recording can not be done on plain paper. The electrosensitive recording system is surely profitable in that sparking ink transfer may be done on plain paper, but is defective in that sparking destroy gives out a foul smell and generates cinders. The thermosensitive transfer system is defective in that the use of a thermal head hampers to obtain a high density image (the maximum of density is about 10 lines/mm) and further retards the recording speed (the maximum of speed is about 1 m sec/dot).

The electric ink transfer system (electric ink transfer recording system), which falls under the same category as the non impact printer, is advantageous, unlike the non impact printer, in that a high density image can be obtained on plain paper, the recording speed is high, and the apparatus employed in this system can be made compact. In view of this, many trials have been made to further improve the electric ink transfer paper used in this system and the system per se, but the fact is that the satisfactorily improved electric ink transfer paper and system have not been proposed yet.

This will be more detailed hereinafter citing examples, that is (i) U.S. Pat. Nos. 2,713,822 and 3,744,611 use the electric ink transfer paper (electric ink transfer recording material) comprising three layers such as insulating layer, electrically conductive layer and ink layer. (ii) Japanese Laid-open Patent Application No. 7246/1978 uses the electric ink transfer paper comprising two layers such as metal powder dispersed electric layer (metal powder dispersed conductive layer) and ink layer. These hitherto proposed recording systems using electric ink transfer recording materials comprise applying electricity in a ribbon for generating Joule's heat therein, melting the ink contained in an ink layer by Joule's heat, and transferring the melted ink to a sheet to be recorded. However, these electric ink transfer recording materials are defective in that said Joule's heat softens the substrate contacting the electrode needle (recording electrode needle) and scrapes off part of the substrate, and this scraped-off substrate part adheres onto the surface of the electrode needle, whereby the travelling faculty of the electrode needle is deteriorated, in other words the normal recording operation is hampered.

SUMMARY OF THE INVENTION

Taking account of the above mentioned circumstances, our inventors have carried out a series of studies and investigations on means capable of eliminating shortcomings as mentioned above while making the best use of the advantages of the electric ink transfer recording system (possibility of effecting high density recording to the extent of about 16 lines/mm, recording speed to the extent of about 0.5 m sec/dot, the apparatus used is compact due to the fact that transfer can be performed only at the stylus-contacting portion, copying can be made using plain paper, and the like) to discover that when applying voltage while interposing an insulating liquid between the ink sheet generating Joule's heat when electrified and having a thermo-melting ink layer and the recording needle (recording electrode needle), the travelling faculty of the recording needle is enhanced and a high quality transfer image can be readily obtained. The present invention has been achieved on the basis of this discovery. And, the primary object of the present invention is to provide an electric ink transfer recording method wherein the recording needle is of a superior travelling faculty. The secondary object of the present invention is to provide an electric ink transfer recording method wherein the recording speed is high.

In other words, the electric ink transfer recording method is designed to obtain a recorded matter by putting a sheet to be recorded and an ink sheet generating Joule's heat when electrified and having a thermo-melting ink layer together, applying electricity to said ink sheet by contacting a return circuit electrode with the ink sheet and a recording electrode needle (stylus) with the surface of the ink sheet and further impressing pulse voltage thereupon, and transferring the ink from the ink sheet to the sheet to be recorded, and is characterized in that an insulating liquid is interposed between the ink sheet and the recording electrode needle when obtaining the recorded matter.

Figure 1:
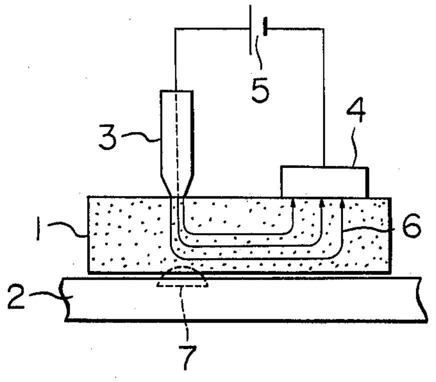
FIG. 1 is a general view of the electric ink transfer recording method (system).

Referring to the reference numerals affixed to the drawing, 1 denotes an ink sheet (electrically conductive ink sheet), 2 denotes a sheet to be recorded (which is generally plain paper, synthetic paper, resin film or the like, but may be a three-dimensional body comprising such a raw material), 3 denotes a recording needle (recording electrode needle), 4 denotes a return circuit electrode, 5 denotes a recording impressed voltage, 6 (indicated by the arrow) denotes a recording electric current, 7 (indicated by the broken line) denotes a thermo-transferring ink transferred from the ink sheet 1 to the sheet to be recorded 2, 8 denotes an insulating liquid, 9 denotes a coloring agent (coloring dye or coloring pigment), and 10 denotes a binder resin.

The ink sheet 1 has the form of having dispersed the coloring agent 9 in the binder resin 10.

Further, reference numeral 1', denotes a roller having wound the ink sheet 1 therearound, 2' denotes a roller having wound the sheet to be recorded 2 therearound, 3' denotes a multistylus, 8' denotes an insulating liquid-applying-station, and 8" denotes an insulating liquid-applying roller.

DETAILED DESCRIPTION OF THE PREFERRED EMBODIMENTS

The ink sheet used in the method according to the present invention, as previously stated, is one designed to generate Joule's heat when electrified and have a thermo-melting ink layer. Accordingly, the recording materials disclosed in U.S. Pat. Nos. 2,713,822 and 3,744,611 in the preceding (i) and the recording material disclosed in Japanese Laid-open No. 7246/1978 in the preceding (ii) may be regarded as the objects of the method according to the present invention.

In particular, the ink sheet used most suitably in the method of the present invention is (iii) a mono-layered sheet-like one as a whole that comprises dispersing the coloring agent 9 in the binder resin 10 as shown in the accompanying drawing. Accordingly, the binder resin used in the ink sheet disclosed in the preceding (iii) is preferable to have a film-forming ability and a sufficient flexibility, and further a softening point in the range of about 100°-250° C. When the binder resin does not have a film-forming ability, it is necessary to employ a thin paper or the like impregnated with the coloring agent 9 and binder resin 10. When the coloring agent 9 does not have an electric conductivity, it is necessary to employ a binder resin which is capable of satisfying the above mentioned conditions as well as has an electric conductivity. As such a binder resin there can be enumerated polycarbonate resin, ethyl cellulose, cellulose acetate, polyvinylbutyral, polyvinyl chloride, polystyrene, polyester, vinyl chloridevinyl acetate copolymer, styrene-butadiene copolymer, acrylic resin, Nylon, rosin, maleic acid resin and the like.

The coloring agent (coloring pigment, coloring dye) 9 is one capable of forming the thermo-transferring ink 7 together with part of the binder resin 10 present therearound. This ink 7 is different from a normally used printing ink in that when the binder resin 10 does not have an electric conductivity, it is necessary for at least the coloring agent 9 to have an electric conductivity. As such a coloring agent 9 there can be enumerated carbon black, in particular furnace type carbon black, acetylene black, lamp black, phthalocyanine pigment, triphenylmethane dye, azo dye, anthraquinone dyes and the like.

The ink sheet 1 may be formed of these binder resin 10 and coloring agent 9 alone, but may be one prepared by adding thereto a suitable additive such as a dispersing agent, plasticizer or the like. This ink sheet is preferable to have an electric resistance of about 0.01-100 Ωcm so as to be solid at normal temperature and a thickness of about 5-30 μm.

As the other ink sheet usable in the method according to the present invention there can enumerated (iv) a recording material that comprises double layers such as a base layer consisting essentially of a resin whose softening point is 150° C. or more and having a surface specific resistance value ($\rho_{s(1)}$) of $1\times10^3-1\times10^6$ Ω and an ink layer consisting essentially of a coloring component and a resin whose softening point of 50°-150° C. and having a surface specific resistance value ($\rho_{s(2)}$) of $1\times10^2-1\times10^5$ Ω, and satisfying the condition: $\rho_{s(1)}>\rho_{s(2)}$.

The resin constituting the base layer herein includes styrene type resin, acrylic resin (methyl methacrylate, ethylacrylate, n-butyl methacrylate, or the like), vinyl chloride type resin (vinyl chloride-vinyl acetate copolymer or the like), styrene resin, polycarbonate resin, polyester resin, polyamide resin, polyvinyl butyral resin and the like.

This base layer is laminated on the ink layer for reinforcing the recording material and plays a role in the application of electricity. Therefore, when the resin used in the base layer has a softening point less than 150° C., its film-forming ability is small, whereby there can not be obtained a sheet having a sufficient strength. Further, when $\rho_{s(1)}$ of the base layer is lower than $1\times10^3$ Ω, the electric current applied flows from the base layer just under the electrode needle in the horizontal direction, and in contrast with this when $\rho_{s(1)}$ is higher than $1\times10^6$ Ω, the electric current applied is hard to flow.

On the other hand, as the resin (binder) constituting the ink layer there can be enumerated acrylic resins having a low softening point such as 2-ethylhexyl acrylate, lauryl methacrylate and the like, polyvinyl butyral resin having a low softening point (low polymerization degree) and the like. This ink layer is designed to be melted with little energy and transfer to the sheet to be recorded. Accordingly, when the softening point of the resin used therein is lower than 50° C., the ink layer is liable to be stained during transport and owing to mutual contact under pressure, and in contrast with this when the said softening point is higher than 150° C. the ink layer melts with low energy, whereby it becomes difficult to form a thermo-transferring ink in conjunction with the coloring component. When $\rho_{s(2)}$ of the ink layer is lower than $1\times10^2$ Ω, it becomes unsuitable for simultaneous impressed voltage recording using a multistylus, and in contrast with this when $\rho_s(2)$ is higher than $1\times10^5$ Ω there is caused necessity of impressing high voltage for recording. In this case, as said coloring compenent there can be any one similar to the coloring agent 9 explained in the preceding (iii).

This ink sheet explained in the preceding (iv) is easy to prepare because it is enough to be a mere uniform dispersion layer containing the conductive material (for instance, carbon black) used in the ink layer in a less quantity than the ink layer does. In this connection, it is to be noted that if the relationship of $\rho_{s(1)}>\rho_{s(2)}$ is not established, recording could not be effected. Further, this ink sheet may be prepared, like the ink sheet explained in the preceding (iii), by adding a proper additive.

The comparison of ink sheets (i), (ii), (iii), and (iv) enumerated heretofore shows that ink sheets (i) and (ii) are designed to that Joule's heat is generated in an electrically conductive layer provided independently of the ink layer and this heat is transmitted to the ink layer for the purpose of melting it. These ink sheets are defective in that at this time the heat is widely distributed, whereby the resolving power of the resulting transfer image is apt to deteriorate and the recording speed is also apt to be retarded. In contrast, the ink sheets (iii) and (iv) are designed so that the ink layer is made conductive and so Joule's heat is generated in the ink layer, whereby the resolving power of the resulting transfer image is high and the recording speed can be enhanced.

The sheet to be recorded 2 is generally plain paper, but should not be limited thereto. As previously stated, said sheet 2 may be synthetic paper, plastic sheet, cloth and the like, and further for that purpose there may be employed not only a plane one but a three-dimensional one.

Figure 2:
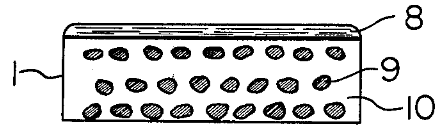
FIG. 2 is a view illustrating the state in which an insulating liquid has been applied onto an ink sheet most usable in the method according to the present invention.
Figure 3:
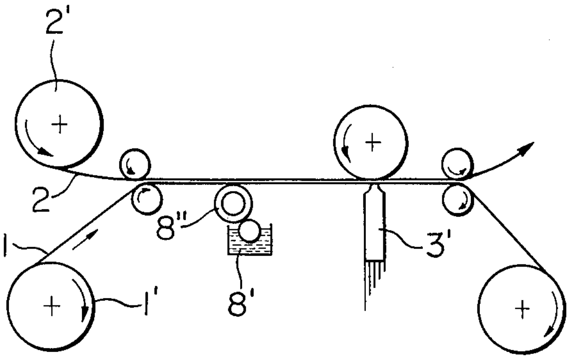
FIG. 3 is a view illustrating one example of the state in which the electric ink transfer recording is actually carried out continuously according to the method disclosed in the present invention.

In the actual practice of the method according to the present invention, explaining about, for instance, the ink sheet disclosed in the preceding (iii), the ink sheet 1 and the sheet to be recorded 2 are closely adhered to each other as illustrated in FIG. 1 or FIG. 3, the return circuit electrode 4 is brought into contact with the ink sheet 1, and then electricity is applied to the ink sheet 1 in the above state by scanning thereupon electric current signals from recording impressed voltage 5 through the recording needle 3. In this instance, however, special attention should be paid to the fact that the insulating liquid 8 has already been coated on the inking sheet 1 (namely, on the surface of the ink sheet 1 on the side being out of contact with the sheet to be recorded 2) as can be seen from FIG. 2 and FIG. 3.

As the insulating liquid 8, there can be employed any one of conventional synthetic oil (diphenyl chloride, polybutene or the like), vegetable oil and mineral oil, but the especially preferable one is silicone oil, fluorine oil.

Coating of the insulating liquid 8 on the ink sheet 1 may suffice if it be effected before the recording needle 3 contacts the ink sheet 1. Accordingly, (1) the insulating liquid 8 may be coated on the ink sheet 1 immediately before electric recording starts as shown in FIG. 3 and (2) it is also possible to coat the insulating liquid 8 on the ink sheet 1 beforehand, wind up said ink sheet 1 while applying a releasing paper thereon and expose the insulating liquid layer 8 while stripping off said releasing paper when effecting electric recording.

When the ink sheet 1 is charged with electricity, the exothermic degree of the ink sheet 1 changes corresponding to the electric current intensity, whereby part of the binder resin melts and the ink component consisted of this melted binder resin and the coloring agent 9 transfers onto the sheet to be recorded 2. Thus, images corresponding to electric current signals are formed on the sheet to be recorded 2.

Although the charging conditions, the number of scanning lines and the like exert a great influence upon the formation of images, the normally employed conditions are such as charged voltage: about 30–500 V, charging time: about 0.5–1 m sec/dot and number of scanning lines: about 3–20 lines/mm.

Referring to the quantity of the insulating liquid coated on the ink sheet 1, it may be very small, the suitable coated thickness being in the range of 0.1–2 μm. And, this ink sheet 1 may be used repeatedly, because the coloring agent 9 in the ink sheet 1, where an intensive electric current has flowed, does not wholly transfer onto the sheet to be recorded 2.

As mentioned above, the method of the present invention permits to perform electric ink transfer recording on plain paper or the like in the manner of forming a very thin insulating lqiuid layer on the ink sheet generating Joule's heat when electrified and having a thermomelting ink layer. Although detailed investigations are not conducted as to why this method can produce a high quality image, this reason is considered to be that the formation of a thin insulating liquid layer on the inking sheet functions to establish a uniform electric contact between the recording needle. And the inking sheet and therefore a dot shape is thereby improved. This provision is further effective for preventing the stylus from being stained by attachment of melted ink.

In this connection, it is to be noted that when electric ink transfer recording was conducted under the same conditions except that the coating of insulating liquid was omitted, the electric contact between the multistylus 3' and the ink sheet generating Joule's heat when electrified and having a thermomelting ink layer was observed to be inferior and the thus obtained ink transfer image was observed to be low quality. In addition thereto, the stylus was observed to be stained by attachment of melted ink. On the other hand, when electric ink transfer recording was carried out by using an electrically conductive liquid in place of the insulating liquid, it was also observed that almost all signal electric current flowed in the electrically conductive liquid and substantially no signal electric current did flow in the ink sheet, thereby hampering the practice of recording.

Furthermore, the method according to the present invention can produce good results such as simplification of the inking sheet-manufacturing process, lowering of the cost of production and so forth because the present invention can employ a monolayered ink sheet, for instance, such as that disclosed in the preceding (iii) if it is of a sufficient flexibility, and dispense with a base by providing a very thin insulating liquid layer on the mono-layered ink sheet.

EXAMPLES

The parts given herein are all by weight.

Example

Polycarbonate resin having a softening point of 230° C. (Panlite L 1225 produced by TEIJIN K.K.)—60 parts Carbon black (HS 500 produced by Asahi Carbon K.K.)—10 parts 1,2-dichloroethane—600 parts Tetrahydrofuran—300 parts A liquid having the above composition was dispersed for 15 hours in a ball mill. The resulting dispersion was coated on a glass substrate. The same was air dried and then stripped from the substrate to thereby obtain an about 20 μm-thick ink sheet having a surface resistance of 900 Ω.

Silicone oil (KF-90 produced by Shinetsu Kagaku K.K.) was coated on the surface of this ink sheet so as to have a thickness of about 1 μm by means of a metal roller. Thereafter, plain paper was superimposed on the back of the ink sheet. A recording needle was brought into contact with the surface of the ink sheet under this state so as to impress pulse voltage of 200 V for 1 m sec between the recording needle (multistylus) and return circuit electrode, whereby a clear-cut ink transfer image having a dot diameter of about 150 μm and a dot density of 1.2 was obtained on plain paper. In this case, it was found that the recording needle was not stained at all.

Still further, recording was carried out under the exactly same conditions as mentioned above except that fluorine oil (Difluoroyl #10 produced by DAIKIN K.K.) was employed in place of the said silicone oil and was coated so as to have a thickness of about 1 μm. Consequently, a clear-cut ink transfer image having a dot diameter of about 150 μm and a dot density of 1.2 was obtained on plain paper. It was found that the recording needle was not stained at all.

Comparative Example 1

Electric ink transfer recording was carried out using the ink sheet prepared according to the above example and omitting the step of coating silicone oil to find that the electric contact between the recording needle (multistylus) and the ink sheet was insufficient, the density of the ink transfer image formed on plain paper under the voltage impressing conditions: 200 V and 1 m sec was light such as 0.7, and in order to attain the same dot density of 1.2 as in the example of the present invention there were required voltage impressing conditions such as 250 V and 1 m sec higher than those used in the present invention.

The surface of the ink sheet which had been recorded under the voltage impressing conditions such as 250 V and 1 m sec was observed to find that melted traces greater than the diameter of said multistylus were left thereon and further the ink was attached to part of the multistylus.

Comparative Example 2

Recording was carried out under the voltage impressing conditions such as 200 V and 1 m sec using a commercially available electrically anisotropic base-having electric ink transfer sheet (namely, an electric ink transfer recording paper comprising an electrically anisotropic base consisting of a resin and copper powder dispersed therein and a thin paper superimposed thereon, said thin paper being impregnated with an electrically conductive substance) and omitting the step of coating silicone oil to find that an ink transfer image formed on plain paper was of a high density such as 1.2–1.3, but the dot shape was out of order and discharge pattern-like. When the recording conditions (voltage impressing conditons) were lowered to 100 V and 1 m sec, it was observed that the image density was lowered to 0.8 and further the dot shape was amorphous and out of order.

We claim:

1. An electric ink transfer recording method for obtaining a recorded matter which comprises putting together a sheet to be recorded and an ink sheet generating Joule's heat when electrified and having a thermomelting ink layer; applying electricity to said ink sheet by contacting a return circuit electrode with the ink sheet and a recording electrode needle with the surface of the ink sheet and impressing pulse voltage thereupon; and transferring the ink from the ink sheet to the sheet to be recorded, characterized in that an insulating liquid is interposed between the ink sheet and the recording electrode needle when obtaining the recorded matter.

2. A method according to claim 1 wherein a 5–30 μm-thick electrically conductive mono-layered ink sheet is used which comprises a dispersion of a coloring agent in a binder resin having a film-forming ability, a sufficient flexibility and a softening point of 100°–250° C., said ink sheet being solid at normal temperature and having an electric resistivity of 0.1–100 Ωcm.

3. A method according to claim 1 wherein a 5–30 μm-thick electrically conductive mono-layered ink sheet is used which comprises a thin paper with a binder resin having a softening point of 100°–250° C. and a coloring agent, said flexible as a whole, solid at normal temperature, and having an electric resistivity of 0.01–100 Ωcm.

4. A method according to claim 1 wherein said insulating liquid is silicone oil or fluorine oil.

5. A method according to claim 1 wherein the insulating liquid is applied onto the ink sheet generating Joule's heat when electrified and having a thermo-melting ink layer before the recording electrode needle is brought into contact with the electrically conductive ink sheet.

6. A method according to claim 1 wherein the quantity of the insulating liquid to be applied onto the ink sheet generating Joule's heat when electrified and having a thermo-melting ink layer is 0.1–2 μm in thickness.

* * * * *

UNITED STATES PATENT AND TRADEMARK OFFICE

CERTIFICATE OF CORRECTION

PATENT NO. : 4 415 903

DATED : November 15, 1983

INVENTOR(S) : Toshiyuki KAWANISHI et al

It is certified that error appears in the above-identified patent and that said Letters Patent is hereby corrected as shown below:

Column 8, line 28; change "0.1-100" to ---0.01-100---.

Column 8, line 31; after "paper" insert ---impregnated---.

Column 8, line 33; after "said" insert ---ink sheet being---.

Signed and Sealed this

*Third* Day of *July 1984*

[SEAL]

*Attest:*

GERALD J. MOSSINGHOFF

*Attesting Officer* *Commissioner of Patents and Trademarks*